US 9,661,050 B2

(12) United States Patent
Killick et al.

(10) Patent No.: US 9,661,050 B2
(45) Date of Patent: May 23, 2017

(54) SYSTEMS AND METHODS FOR SEGMENTATION OF CONTENT PLAYLIST AND DYNAMIC CONTENT INSERTION

(71) Applicant: Cox Communications, Inc., Atlanta, GA (US)

(72) Inventors: Raynald H. Killick, Atlanta, GA (US); Muhammad Asif Raza, Norcross, GA (US)

(73) Assignee: Cox Communications, Inc., Atlanta, GA (US)

( * ) Notice: Subject to any disclaimer, the term of this patent is extended or adjusted under 35 U.S.C. 154(b) by 242 days.

(21) Appl. No.: 14/678,499

(22) Filed: Apr. 3, 2015

(65) Prior Publication Data

US 2016/0294909 A1    Oct. 6, 2016

(51) Int. Cl.
*G06F 15/16* (2006.01)
*H04L 29/06* (2006.01)
*H04L 29/08* (2006.01)
*H04L 12/58* (2006.01)

(52) U.S. Cl.
CPC ......... *H04L 65/605* (2013.01); *H04L 51/046* (2013.01); *H04L 65/4076* (2013.01); *H04L 67/22* (2013.01); *H04L 67/306* (2013.01)

(58) Field of Classification Search
USPC .......................... 709/205, 200, 203, 220, 224
See application file for complete search history.

(56) References Cited

U.S. PATENT DOCUMENTS

2012/0272266 A1* 10/2012 Ou .................. G06Q 30/02
725/34
2014/0025836 A1*  1/2014 Gupta ............... H04N 21/8456
709/231

(Continued)

*Primary Examiner* — El Hadji Sall
(74) *Attorney, Agent, or Firm* — Eversheds-Sutherland (US) LLP

(57) ABSTRACT

This disclosure describes systems, methods, and computer-readable media related to segmenting media content playlist for dynamic insertion of non-entertainment content during a streaming session.
A request for media content associated with a streaming session in a network may be received from one or more client devices. In response to the received request, a media content playlist may be identified. In response to the received request, a non-entertainment playlist may be identified, where the non-entertainment playlist comprises one or more references pointing to one or more non-entertainment content, the one or more references including at least a first reference pointing to a first non-entertainment content and a second reference pointing to a second non-entertainment content. the media content playlist may be segmented into one or more segments including at least a first segment and a second segment. the first reference may be appended to the first segment and the second reference may be appended to the second segment. the first segment and the appended first reference may be transmitted for consumption by the one or more client devices. based at least in part on a received indication, it may be determined to update the second non-entertainment content with a third non-entertainment content using the second reference. the second non-entertainment content may be updated with the third non-entertainment content.

20 Claims, 5 Drawing Sheets

(56) References Cited

U.S. PATENT DOCUMENTS

| | | | | |
|---|---|---|---|---|
| 2014/0355789 A1* | 12/2014 | Bohrarper | ................ | H04R 3/00 |
| | | | | 381/119 |
| 2016/0065637 A1* | 3/2016 | O'Malley | ............. | H04L 67/306 |
| | | | | 709/231 |
| 2016/0189249 A1* | 6/2016 | Meyer | ................ | G06Q 30/0277 |
| | | | | 705/14.66 |

* cited by examiner

SYSTEMS AND METHODS FOR SEGMENTATION OF CONTENT PLAYLIST AND DYNAMIC CONTENT INSERTION

TECHNICAL FIELD

This invention generally relates to digital media delivery, and more particularly to segmentation of playlist for dynamic content insertion.

BACKGROUND

Media service providers, such as broadcasters and multi-service operators (MSO), may provide non-entertainment content (e.g., advertisements, referred to hereinafter as "ads") during a media content (e.g., TV show, movie, etc.). Typically, a user may request playback of media content using a device appropriate for streaming such content, such as a tablet, a phone, a smart television ("TV") set, or a set-top box. Techniques may be used to generate a playlist for the media content and the non-entertainment content. The playlist may be sent to a client device for streaming of the media content and/or the ads. Each time a media content asset is requested by a user, a playlist is generated for that session with non-entertainment content, and once created the playlist is not updated.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Figure 1:
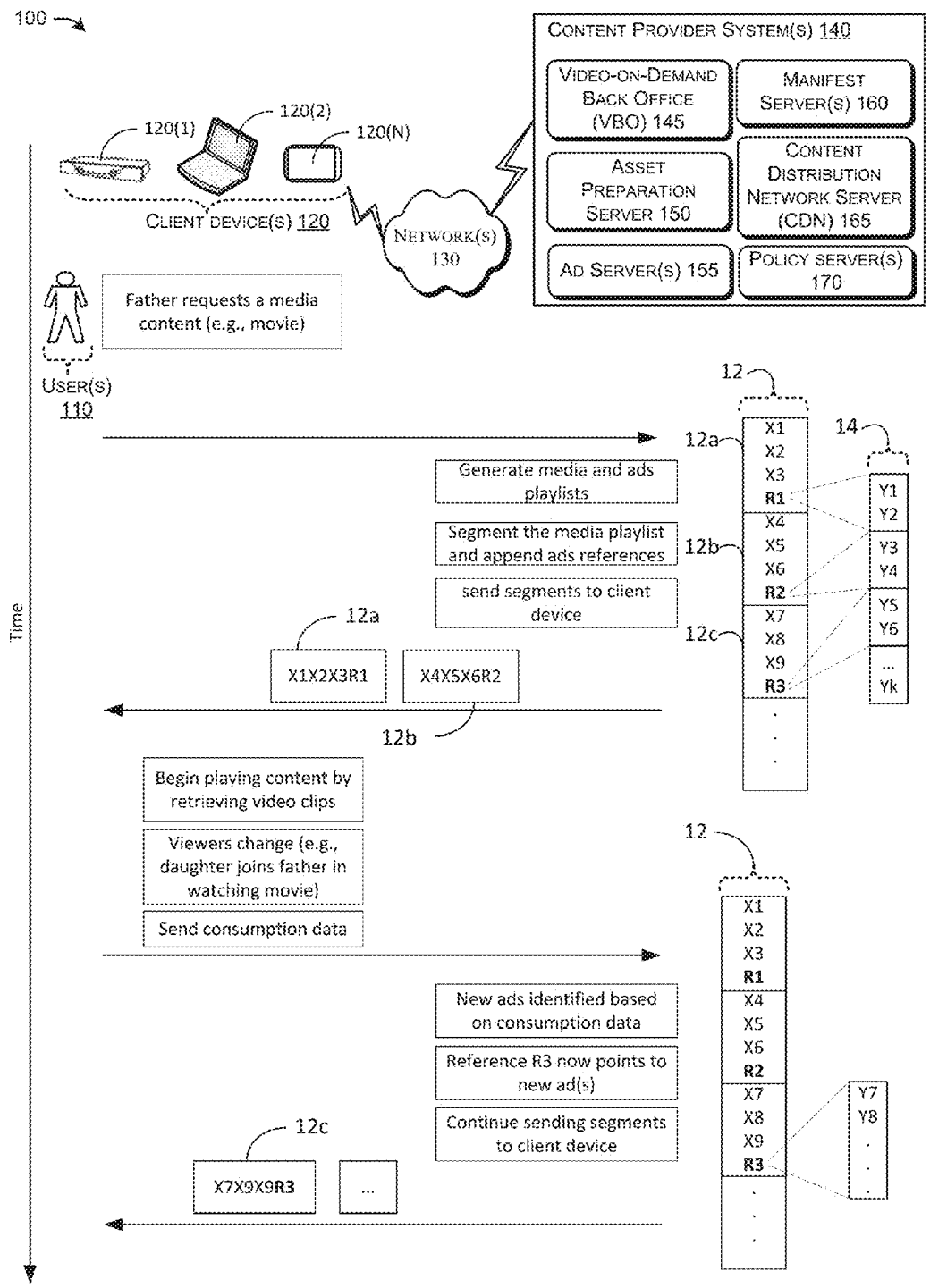
FIG. 1 is a simplified schematic diagram illustrating an example playlist segmentation system that may be operated in accordance with embodiments of the disclosure.

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Example embodiments of the disclosure may provide systems, apparatus, and methods for segmenting media content playlist to allow dynamic insertion of non-entertainment content during a streaming session. The dynamic insertion of non-entertainment content may be implemented to update the non-entertainment content near real-time based on feedback received from the one or more client devices. Examples of media content may include entertainment content (e.g., television show, on-demand movie, etc.), instructional content, educational content or other types of media. Examples of non-entertainment content may be emergency alert system (EAS) messages, billing reminders, announcements or advertisements. It is understood that a playlist may be a list of indexes (also referred to as references) pointing to data portions, where the data may be a media content or a non-entertainment content. For example, an ad playlist may be a list of indexes referencing ads that may be presented to a client device. Accordingly, in one embodiment, a playlist for an on-demand movie may be segmented into a number of smaller playlists, wherein each of the segmented playlists may have a non-entertainment playlist(s) or reference, such as for one or more ads, appended to its end. As each segmented playlist is sent to client device a decision as to the ad(s) to be appended at the end of each segment for playing between the segments can be made and/or updated.

In some embodiments, segmentation of a media content may be implemented to support real-time or near real-time non-entertainment content updates. For example, a media content playlist may be broken down into small playlist files, referred to as segments, to enable dynamic insertion (including replacement) and rapid handling of non-entertainment content. In one embodiment, the segments may be provided to a client device in piecemeal, which may allow real-time or near-real time updates to non-entertainment content that may not have been transmitted to the client device yet. For example, one or more video clips may be transmitted first to the client device, and then followed by ads. If during the transmittal of the one or more video clips and before playing the ads, changes occur, for example, in the proximity of the client device or a change in an ad campaign, etc., the ads may be updated such that new ads may be sent to the client device. For example, changes that may occur at the proximity of the client device may include changes to the user profile, viewing location, type of media content requested, etc. Therefore, the non-entertainment content may be updated as the media content is being displayed or played (e.g., in real-time or near real-time) at the client device. The segmentation of a media content playlist may be based on various factors, such as, expected frequency and/or the type of non-entertainment content that an on-demand system may handle. For ad insertion, as an example, a media content playlist may be segmented at ad breaks of the on-demand asset. However, in an EAS example, a more granular segmentation may be more optimal to enable faster insertion of the EAS playlist into the media content playlist due to the emergency nature of the EAS messages. Therefore, non-entertainment content may be dynamically updated in real-time or near real-time based on, for example, the changes that may occur in the proximity of the client device.

In one embodiment, non-entertainment references may be appended to a media playlist segments rather than a non-entertainment playlist, and the non-entertainment reference may point to or reference different non-entertainment content on a per user basis. The non-entertainment references may point to a variable non-entertainment content, such that, the non-entertainment content may change but the non-entertainment references remain the same. For example, a plurality of users may receive the same or substantially similar playlist for a specific media content (e.g., the same movie) that may include the same non-entertainment references at predetermined offsets. This may allow flexibility for updating the non-entertainment content at the location (e.g., memory in a service provider system) to which the reference points or references. There is no need to update the segmented playlist for the media content that already includes the references from user to user. This may result in substantial savings because this eliminates the need to create a new segmented playlist of a media content with non-entertainment playlist inserted thereto for each new streaming session for that media content.

In an embodiment, a non-entertainment reference may point to a location where non-entertainment content is stored for certain media content, and over time that non-entertainment content may change during each new streaming session for the media content. The non-entertainment reference may be based on an actual media content request, the time the media content is requested, and the profile of the user requesting the media content. The non-entertainment reference may be constant and associated with a position of the on-demand asset such as a specific ad break, for example, in the case of ads. For instance, many on-demand media content assets include "Normal Play Time" ("NPT") notations, which essentially bookmark timed offset into the media content.

In some embodiments, the dynamic insertion of non-entertainment content in a segmented media content playlist may be executed based, for example, on a change in the users and/or viewers of the media content, a change in ad campaigns associated with the non-entertainment content, elapsed time since the original playlist was prepared, etc. For instance, an ad may be selected by a service provider system (e.g., a cable company) based at least in part on the user that requested the streaming of the media content (e.g., pay-per-view TV show, etc.). However, the user or group of users, that is determined to be the viewer of the media content using a client device, may change and the media content may be viewed by a different user or group of users, or perhaps the number of views for the selected ad reaches a certain threshold after selection but prior to playing and another ad suitable for insertion has not, or yet further, the location where the user is viewing the media content may have changed, for example, from a residence to a coffee shop. In any of these instances, it may be desirable to change the ad originally selected and inserted into the media content playlist with another ad prior to the viewing of that ad and/or prior to the replay of that ad, as may occur if the content is rewound to a point prior to the point of the ad.

FIG. 1 is a simplified schematic diagram illustrating playlist segmentation system 100 where a playlist 12 containing a combination of indexes to media content (e.g., a movie) and references to non-entertainment content (e.g., ads, EAS messages, billing reminders, and announcements is segmented and sent to user(s) 110 for consumption may be segmented.

As explained above, a playlist may be a list of indexes (also referred to as references) pointing to data portions, where the data may be a media content or a non-entertainment content. Playlist 12 may include indexes to media content data portions (e.g., X1, X2, X3, . . . ) and a reference (e.g., R1) that points to a non-entertainment content list 14, containing one or more non-entertainment content (e.g., ads). For example, R1 may point to a portion of list 14 comprised of one or more ads (e.g., Y1, Y2). The list of ads may change over time while a user is viewing the movie, however, reference R1 may remain the same. As a result, the reference R1 continues to point to the same memory location where the list of ads are located even though the ads may be updated over time. The list 14 may be dynamically replaced based on viewing data that may be received from one or more client devices 120(1)-(N), collectively or individually referred to hereinafter as client device 120. Viewing data may include indicators of the users viewing the media content, location of the viewing, a change in the users viewing the media content, time of day, user interactions with the client device 120, user consumption history, type of media content being viewed, etc. For purposes of the disclosure, all the above may be referred to herein collectively or individually as consumptions data.

The client devices 120 may communicate with the service provider system(s) 140 through one or more networks 130. It will be appreciated that the client device 120 may be any device suitable for rendering content, including, but not limited to, a television, a set-top box (STB), a smart phone, a tablet computing device, a notebook computer, an eBook reader, wearable computing device (e.g., smart watch or glasses), combinations thereof, or the like. The client device 120 may be configured to receive one or more signals, such as a variety of audio/video signals, from the service provider system(s) 140 for the purposes of rendering content and/or ads to the user. It should also be noted that some of the client devices 120 may include, but is not limited to, a cable STB, television with integrated STB, IP on-demand device, or satellite signal receiver. The client device(s) 120 may consume the media content requested by the user 110 by sequentially rendering the segments associated with the media content playlist on an audio/visual output interface of the client device 120. The client device 120 may receive a media content playlist that may be associated with the media content (e.g., a movie) and/or non-entertainment content (e.g., ads). The media content playlist is understood to be a list of references/indexes to discrete segments of the actual media content that may be played at the client device 120.

The service provider system(s) 140 is a system that may facilitate the streaming of media content and/or non-entertainment content, to one or more client devices 120. The service provider system(s) 140 may be configured to interact with the client device 120 to provide the client device 120 with media content and/or non-entertainment content and/or signals associated therewith, for the purposes of rendering the media content and/or the non-entertainment content on the client device 120. The service provider system(s) 140 may include a video on-demand back-office server (VBO) 145, an asset preparation server 150, an ad server 155, a manifest server 160, a policy server 170 and/or a content distribution network (CDN) 165.

In one embodiment, in response to receiving a request from the user 110 for a media content, the VBO 145 may be configured to return a media content reference master list. For example, when a user 110 selects a media content (e.g., pay-per-view movie) to be played on the client device 120, the client device 120 may communicate with the VBO 145 to request that title or asset. The VBO 145 may return to the client device 120 a master index that may contain indexes to multiple stream profiles that point to locations of various data portions such as video clips. The multiple stream profiles may be various versions of the same media content based on bandwidth and/or device type, etc. When the indexes of one of the multiple stream profiles are combined, they may constitute the requested media content (e.g., the pay-per-view movie). The multiple stream profiles may be based, at least in part, on resources and/or the type of client device used to display or play the media content. For example, one of the multiple stream profiles may be associated with a certain available bandwidth. In addition, one of the various playlists may be associated with a client device that may be a smartphone as opposed to a set-top box.

Once the client device 120 receives the master index containing indexes to the multiple stream profiles, the client device 120 may determine which of the multiple stream profiles to utilize under the current conditions (e.g., resources and/or type of user device). The client device 120 may request one of the stream profiles from the manifest server 160. Consequently, the manifest server 160 may request non-entertainment content from the ad server 155 to determine the ads that may be presented to the user 110. Additionally, the manifest server 160 may request the media content from the CDN 165 based, at least in part, on the playlist requested by the client device 120, in order to deliver the associated media content to the client device 120.

The CDN 165 may be configured to distribute the media content (e.g., the pay-per-view movie) to a user 110 based upon a geographic location of the user and/or the origin of the media content. The CDN 165 may be an interconnected system of computers that may provide content to one or more users based at least on proximity between the CDN 165 and the one or more client devices 120 associated with the users. The CDN 165 may also be configured to duplicate a media content on multiple servers to disperse the content to users that are located closest to each of those servers. This may allow the distribution of the media content efficiently and reliably during various network conditions. The CDN 165 may also be configured to download a media content playlist to the manifest server 160 for delivery to the client device 120.

In an embodiment, the asset preparation server 150 may perform operations to prepare a media content for transmission to the client device 120 at the time the media content is requested by a user or, in some instances, before being requested. For example, the asset preparation server 150 may modify the format of the video, create one or more adaptive bit rate (ABR) stream profiles and perform authentication and/or encryption. ABR is a technique that may detect a client device's bandwidth and processing capacity in real-time. A single media content (e.g., a movie) may be encoded into one or more stream profiles at multiple bit rates. The client device 120 may receive the one or more stream profiles and may switch between streaming the different encodings depending on, for example, available resources. ABR may result in less buffering, fast start time better performance under various conditions.

In some embodiments, some of the operations employed by the asset preparation server 150 may include transcoding the media content into appropriate format (e.g., MPEG-DASH, HOS, etc.). The asset preparation server 150 may create one or more ABR stream profiles that may be used based on network conditions. The asset preparation server 150 may be configured to perform authentication and encryption of the data portions before transmission to the user 110. For example, the father in FIG. 1 may request a movie, and in response the asset preparation server 150 may transcode (or may have transcoded before the request) the movie from an MPEG-2 format into one or more ABR stream profiles that may be in the MPEG-4 format. The one or more ABR stream profiles may be selected based, for example, on network conditions. For example, if the network condition is poor, such as low bandwidth, a profile associated with that network condition may be utilized if the user 110 requests the playback of the media content. It is understood that the above is only an example of a type of a media content, and other types may be operated on by the asset preparation server 150.

In one embodiment, the ad server 155 may be configured to generate non-entertainment (e.g., EAS messages, billing notification, ads, etc.) playlists. For example, in the case of ads, an ad playlist may be determined based on various ad campaigns being run by the service provider system(s) 140, the type of content requested, and/or an account of the user(s) associated with a client device. For example, the ad server 155 may select ads to be presented to a client device 120 based on a user profile, time of day, user device, user subscription, media content, or any other criteria determined by the system or network administrator. The ad server 155 may be configured to select ad campaign based on new and/or updated user information while the user 110 may be viewing a content (e.g., a movie). The ad server 155 may further be configured to access a user preference database to retrieve information associated with the preferences, demographics, and/or historical behavior of one or more of the users (e.g., user 110) within the viewing zone of the client device (e.g., client device 120), as indicated in the received content and/or ad request. The ad server 155 may also be configured to receive information pertaining to ad campaigns that are being run and/or ads that are available for providing and/or rendering to users 110 of the client devices 120.

Accordingly, in an embodiment, once the father requests the movie and the client device 120 communicates with the VBO 145 through network(s) 130, then the identification of the father as the viewer may influence which ad(s) may be included in the media content playlist. For example, the ads selected may be targeted at and/or suitable for an adult male. The system may collect consumption data by at least performing detection techniques that may determine identification of one or more users in proximity to the client device 120 when the media content was requested. Some examples of the detection techniques may be determining the location of the client device 120, performing voice recognition of one or more users 110, detecting selections made on the client device 120 by one or more users 110. It is understood that the above detection techniques are only examples and that other detection techniques to determine the changes occurring in the proximity of the client device 120 or the location of the client device 120 may be employed. It is also understood that this is only an example and that other examples may be implemented.

In one embodiment, the manifest server 160 may be configured to receive the media content playlist from the CDN 165. A media content playlist may contain one or more indexes, Xi, to the media content, where X is an index pointing to the location of a data portion (e.g., video portion) and where i is an integer.

In one embodiment, the manifest server 160 may be configured to receive the non-entertainment playlist from the ad server 155. The non-entertainment playlist may contain one or more indexes (references), Rj, which may point to memory locations where one or more non-entertainment content Y1, Y2 . . . Yk may reside, and j and k are integers. It is understood that even though the example in FIG. 1 is shown with ads as the non-entertainment content, the non-entertainment content list 114 may be comprised of one or more ads, EAS messages, billing reminders, and announcements, etc.

In some embodiments, the manifest server 160 may be configured to generate a playlist 12 containing the media content playlist and the non-entertainment playlist. The manifest server 160 may segment the media content playlist into one or more segments and append one or more references Rj to each segment 12a, 12b, 12c, etc. (e.g., as shown in FIG. 1, X1X2X3R1, X4X5X6R2, X7X8X9R3, etc.). Each segment having a predetermined number of indexes to media content data portions followed by a reference to non-entertainment content. In other words, playlist 12 may be segmented/divided into one or more segments, which may contain a number of indexes to data portions (e.g., indexes to video portions) comprising the media content followed by a reference to non-entertainment content (e.g., ads). The size of the segment may be based on a length of time, or may be based on the number of indexes within each segment. For example, each segment may have 10 indexes or each segment may contain 15 minutes of video clips, which may be any number of a combination of indexes. This also may vary from segment to segment. Each index may point to a variable length of video clip. The number of indexes to data portions within a segment may be determined by various factors such as, network capability, user profile, media content, etc. For example, the media content playlist may contain indexes (e.g., X1, X2, X3, Xi). The manifest server 160 may divide/segment the media content playlist into segments (e.g., X1X2X3, X4X5X6, etc.) and may append one more non-entertainment references (R1, R2, R3, etc.) at the end of each of these segments. The manifest server 160 may send these segments, and the appended non-entertainment references, as shown in FIG. 1, segments 12a, 12b, and 12c, to the client device 120 at various intervals as opposed to sending the entire playlist 12 to the client device 120. Although the Rj indexes are sent to the client device 120, these indexes do not change but instead, the non-entertainment content they point to may be modified based on consumption data from the client device 120, or other indications, such as time of day, type of client device, EAS message indication, billing reminder indication, announcement indication, etc. . . . Further, although the above example shows that the segmentation may be done dynamically at the time of the request, in some embodiments, the segmentation may be done before the request for the media content (e.g., a movie). That is, the segmented playlist may have been segmented even before the request has been made by the user. One or more users may receive the same or substantially similar playlist for specific media content including non-entertainment references at various offsets. Since the non-entertainment references may remain the same, there is no need to update a segmented playlist for the media content that already includes the references from user to user.

In one embodiment, the intervals at which the segments may be sent to the client device 120 may be set as time or data intervals. For example, for every interval of time, a segment may be sent to the client device 120, or alternatively, for every data size interval, a segment may be sent to the client device 120. The client device 120 may receive these segments sequentially and may use the first segment (e.g., X1X2X3R1) to retrieve the media content (e.g., video portions) associated with indexes X1, X2 and X3 and the non-entertainment content associated with reference R1. The reference R1 may point to one or more non-entertainment content, such as, an EAS message, billing reminder, announcement or advertisement. Although a segment is shown to comprise four indexes (e.g., X1, X2, X3 and R1), it is understood that this is only for illustrative purposes and that segments may include any suitable number of indexes. The number of segments may be configurable in a manner to allow the flexibility to send one or more segments based upon configurable criteria. For example, the longer the duration and/or size of the segments are, the fewer the number of segments, and the shorter the duration and/or size of the segments are, the more the number of segments. The configurable criteria may be associated with at least one of network resources, user profile, user device, user subscription, business user or home user, media content, or any other criteria determined by a system or network administrator.

In one embodiment, modification to the non-entertainment content may occur in real-time or near real-time. For example, although ads may have been selected for presentation to the user(s) 110 (e.g., father in FIG. 1), a new/updated ad decision may be made in real-time or near real-time of playing certain segments while the user(s) 110 views the media content. The manifest server 160 may determine based at least in part on a received indication that a change is necessary for new/updated non-entertainment content (e.g., ads, billing reminders, announcement, and/or EAS). For example, the indication may include receiving the consumption data associated with the consumption of one or more segments, including the references, by the client device 120. The indication may also include receiving indication that an emergency message may need to be sent to the client device 120 or that a billing reminder or a certain announcement may need to be sent to the client device 120. For example, while a client device 120 may be using indexes to retrieve the media content or the references to retrieve the non-entertainment content, a new ad campaign may be initiated or become relevant based on the consumption data that may be received by the manifest server 160 from the client device 120, which may result in a new non-entertainment playlist. Consumption data may be based on at least one or more user interactions with the media content, time of day, user profile, user age demographics, user behavior, etc. For example, if a user is surfing the web at late hours, an ad campaign may be geared to a user watching a media content at late hours, such that, relevant ads may be utilized for that user. Similarly, if the user is viewing media content during the morning hours, the ad campaign may be a family oriented ad campaign. For example, if a user requests an asset but another user joins the user in viewing the asset, the manifest server 160 may update the ads that may be rendered at the client device 120.

Continuing with the example of FIG. 1, although ads may have been selected for presentation to the father, a new/updated ad decision may be made in real-time or near real-time and while the father views the media content. For example, the father may start watching the selected movie by playing the media content segments using the received indexes (e.g., indexes X1, X2, and X3). The client device 120 may process the segments (e.g., X1X2X3) in order to render the related portions of the actual media content data portions associated with the indexes X1, X2, and X3. In the meantime, events may trigger the client device 120 to send consumption data to the manifest server 160. Consumption data may be sent when one or more events occur, such as, a change in the user(s) 110 viewing the media content, time of day, user interactions with the client device 120, predetermined time intervals, etc. For example, if a daughter joins her father in the room to watch the movie, the client device 120 may detect the change in the users watching the movie and may report such a change to the manifest server 160. The client device 120 may contain circuitry that may collect consumption data by at least performing detection techniques that may determine identification of one or more users in proximity to the client device 120. Although the above example shows that consumption data may be sent, other indication may trigger the manifest server 160 to change/update the non-entertainment content, e.g., billing reminder indication, announcement indication, and emergency content indication, where the manifest server may receive an indication that an EAS message may need to sent to the client device 120.

In some embodiments, the manifest server 160 may update the ads referenced by the one or more non-entertainment references or indexes $R_i$ in playlist 12. For example, and still referencing FIG. 1, when the daughter enters the room to watch the movie with her father, consumption data may be sent to the manifest server 160. The manifest server 160 may determine that a change in non-entertainment content is necessary. The manifest server may utilize the non-entertainment references in the playlist 12 to update the non-entertainment content list 14 found at the locations pointed to by the non-entertainment references. For example, the R3 reference in the playlist 12 may continue to reference the same memory location of the original ads, however, the ads referenced by the R3 reference may be updated/replaced to reflect new ads. The manifest server 160 may continue sending the segments at the time interval and/or the data size interval.

In another embodiment, the policy server 170 may be configured to communicate with the manifest server 160 to enforce certain policies to influence non-entertainment decisions, segmentation of playlists, duration of segment, or any other user related decisions. The policies may be based, at least in part on user specific information that may be maintained either by the policy server 170 or by a user database. The user specific information may include at least information related to user profile, user subscriptions, user location, history of purchases, viewing history, demographics, content, or any other user related information. Based on the user specific information, the policy server 170 may provide policies that will, for example, assist in determining how many ads to insert in a playlist, how many segments in a playlist, the type of streaming profile to use, the quality of service to provide the user, etc. For example, the policy server 170 may determine that the asset requested by the user 110 using the client device 120 may be associated with an ad insertion policy or may be associated with an emergency content insertion policy, bill reminders, or any other applicable policies. Consequently, the manifest server 160 may apply one or more of these policies when performing the segmentation of the media content playlist and when selecting the ad playlist to be used for the user 110.

Using the quality of service as an example, if a user, for example, pays $10.99 to view a media content, the policy server may apply a certain quality of service to that content. The policy server 170 may determine that a stream profile providing a higher resolution may be appropriate for that user. Another policy may be that since this user paid for the media content, then less ads may be inserted. Consequently, the manifest server 160, using those policies, may segment the playlist of the media content and the non-entertainment content accordingly. For example, having less non-entertainment content may allow for lager segments of the playlist. Another example may include a policy that may be based on a user's viewing history. For example, if the user frequently watches action movies, the policy server may access the user specific information (e.g., viewing history) to determine that an appropriate policy may be to insert ads that are related to action movies. Consequently, the manifest server 160 using that policy may dynamically insert such ads at the various locations that the non-entertainment references point to. It is understood that the above are only examples of policies that may be provided by the policy server 170.

Figure 2:
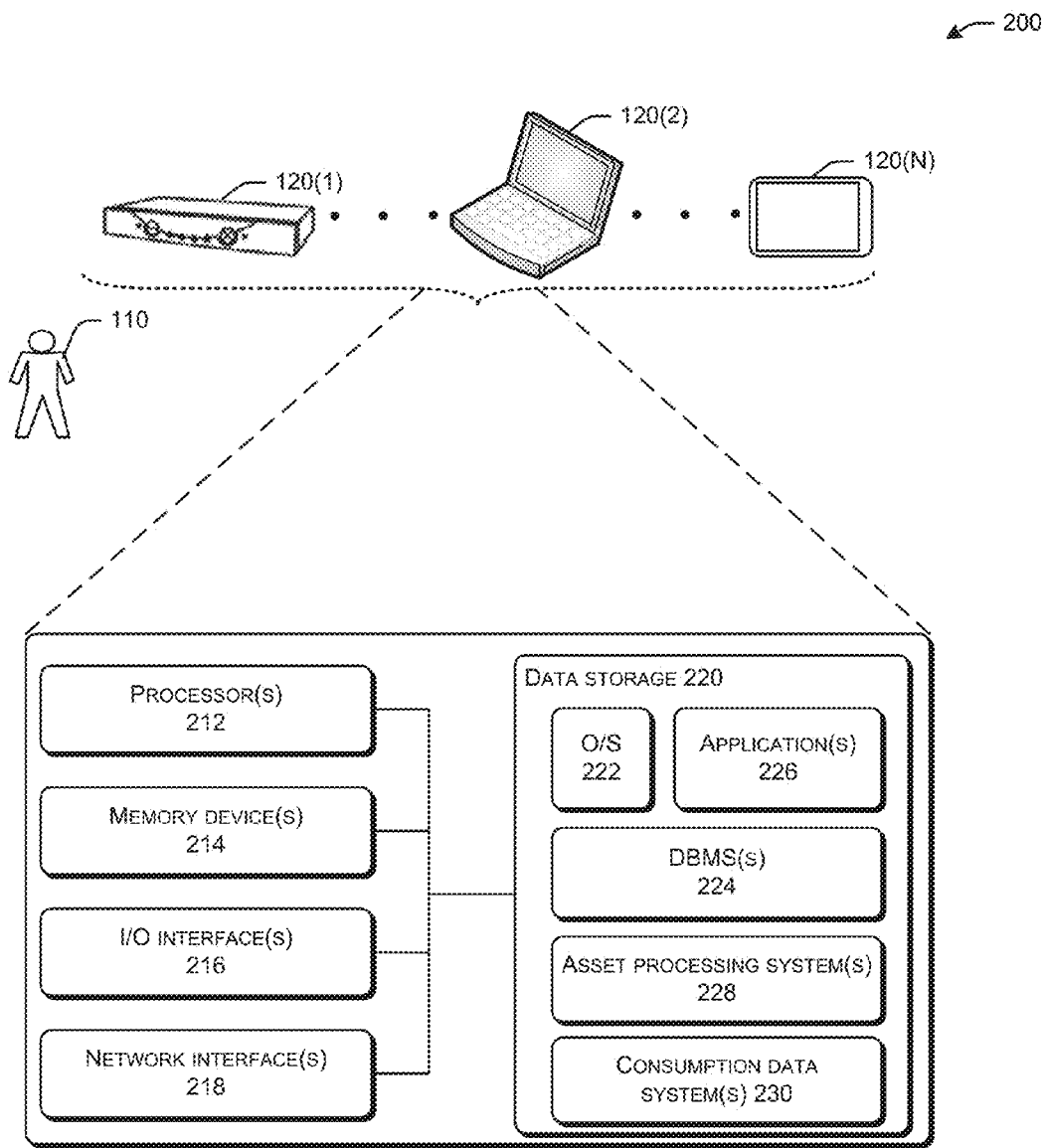
FIG. 2 is a simplified block diagram illustrating a client device of the playlist segmentation system of FIG. 1, in accordance with embodiments of the disclosure.

FIG. 2 depicts an illustrative diagram of a client device 120 configuration, in accordance with one or more embodiments of the disclosure. As explained above, the client device 120 may include one or more client devices 120 that may be associated with one or more users 110. Each of the client device(s) 120 may include one or more processors (processor(s)) 212, one or more memory devices 214 (generically referred to herein as memory 214), one or more input/output ("I/O") interface(s) 216, one or more network interface(s) 218, and data storage 220. These various components will be described in more detail hereinafter.

The client device(s) 120 may include one or more processors 212 and one or more memories 214 (referred to herein generically as memory 214). The processor(s) 212 may include any suitable processing unit capable of accepting digital data as input, processing the input data based on stored computer-executable instructions, and generating output data. The computer-executable instructions may be stored, for example, in the data storage 220 and may include, among other things, operating system software and application software. The computer-executable instructions may be retrieved from the data storage 220 and loaded into the memory 214 as needed for execution. The processor(s) 212 may be configured to execute the computer-executable instructions to cause various operations to be performed. The processor(s) 212 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 220 may store program instructions that are loadable and executable by the processor(s) 212, as well as data manipulated and generated by the processor(s) 212 during execution of the program instructions. The program instructions may be loaded into the memory 214 as needed for execution. Depending on the configuration and implementation of the client device(s) 120, the memory 214 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 214 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The client device(s) 120 may further include additional data storage 220 such as removable storage and/or non-removable storage including, but not limited to, magnetic storage, optical disk storage, and/or tape storage. Data storage 220 may provide non-volatile storage of computer-executable instructions and other data. The memory 214 and/or the data storage 220, removable and/or non-removable, are examples of computer-readable storage media (CRSM).

The client device(s) 120 may further include network interface(s) 218 that facilitate communication between the client device(s) 120 and other devices of the illustrative playlist segmentation system 100 or application software via the network(s) 130.

The client device(s) 120 may additionally include one or more input/output (I/O) interfaces 216 (and optionally associated software components such as device drivers) that may support interaction between a user 110 and a variety of I/O devices, such as a keyboard, a mouse, a pen, a pointing device, a voice input device, a touch input device, a display, speakers, a camera, a microphone, a printer, and so forth.

Referring again to the data storage 220, various program modules, applications, or the like may be stored therein that may comprise computer-executable instructions that when executed by the processor(s) 212 cause various operations to be performed. The memory 214 may have loaded from the data storage 220 one or more operating systems (O/S) 222 that may provide an interface between other application software (e.g., dedicated applications, a browser application, a web-based application, a distributed client-server application, etc.) executing on the client device 120 and the hardware resources of the client device 120. More specifically, the O/S 222 may include a set of computer-executable instructions for managing the hardware resources of the client device(s) 120 and for providing common services to other application programs (e.g., managing memory allocation among various application programs). The O/S 222 may include any operating system now known or which may be developed in the future including, but not limited to, any mobile operating system, desktop or laptop operating system, mainframe operating system, or any other proprietary or open-source operating system.

The data storage 220 may further include one or more database management systems (DBMS) 224 for accessing, retrieving, storing, and/or manipulating data stored in one or more datastores. The DBMS 224 may use any of a variety of database models (e.g., relational model, object model, etc.) and may support any of a variety of query languages.

The data storage 220 may additionally include various other program modules that may include computer-executable instructions for supporting a variety of associated functionality. For example, the data storage 220 may include one or more application(s) 226. Further, the data storage 220 may include an asset processing system(s) 228.

The application(s) 226 may include computer-executable instructions that in response to execution by the processor(s) 212 cause operations to be performed including executing of different functionality specific to the application(s) 226. In some embodiments, the application(s) 226, in response to receiving the notification, may initiate data synchronization with one or more remote servers, access the Internet, request media content, display media content display email, or the like. It is understood that the above are only examples and other applications may be available on any of the client device(s) 120.

The asset processing system(s) 228 may be configured to provide a variety of functionality associated with receiving a media content playlist that may include indexes to one or more media content and/or non-entertainment content based at least in part on one or more users (e.g., the user(s) 110). The asset processing system(s) 228 may communicate with the VBO 145 to request a specific media content asset (e.g., a movie). The asset processing system(s) 228 may receive and process from the manifest server 160 a playlist that may contain indexes to media content (e.g., a movie) and/or a non-entertainment content (e.g., ads). The playlist may be in the form of a list of uniform resource identifiers (URIs) that may point to the location of the actual entertainment and/or non-entertainment content. The asset processing system(s) 228 may also receive and process playlist segments from the manifest server 160 in order to render the actual media content and/or non-entertainment content on the client device 120.

The consumption data system(s) 230 may be configured to communicate changes to the manifest server 160 that may occur in the proximity of the client device 120. Some of the changes may be a change in the user(s) 110 viewing the media content, location, time of day, user interactions with the client device 120, user consumption history, type of media content being viewed, etc. The consumption data system(s) 230 may be configured to detect one or more of the above changes based on the user of the client device 120 during the streaming session of the media content. For example, a user 110 may leave a room while another user 110 may continue to stream the media content. The consumption data system(s) 230 may determine that one user 110 may have left the proximity of the client device 120. The consumption data system(s) 230 may communicate this change to the manifest server 160. Consequently, the manifest server 160 may be kept abreast of changes associated with the user 110 in the proximity of one or more client devices 120. The consumption data system(s) 230 may perform detection techniques that may determine one or more of the above changes. Some examples of the detection techniques may be scanning of the client device 120 location, performing voice recognition of one or more users 110, detecting selections made on the client device 120 by the user 110. It is understood that the above detection techniques are only examples and that other detection techniques to determine the changes occurring in the proximity of the client device 120 may be employed.

Figure 3:
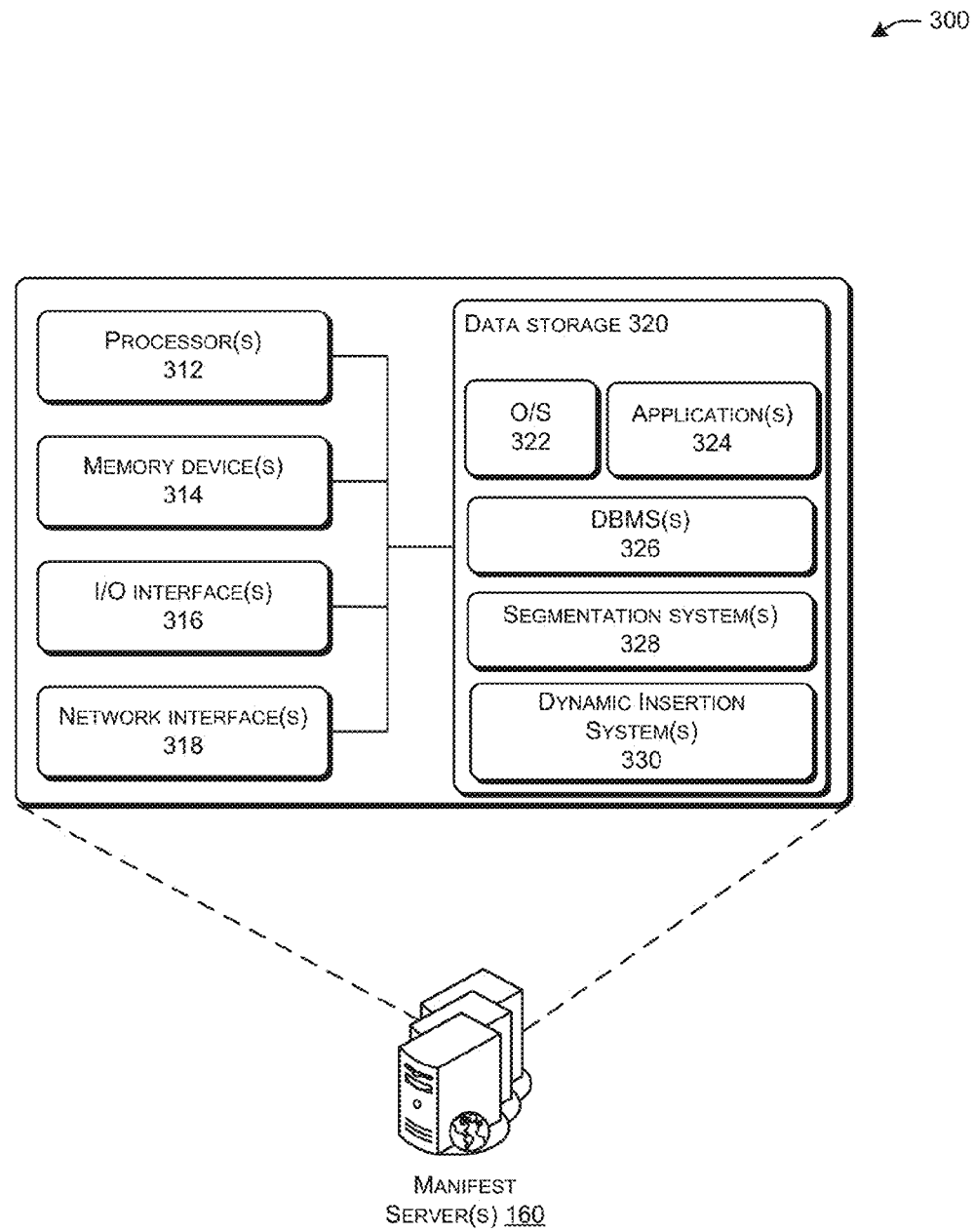
FIG. 3 is a simplified block diagram illustrating a manifest server of the playlist segmentation system of FIG. 1, in accordance with embodiments of the disclosure.

FIG. 3 depicts an illustrative diagram configuration including various hardware and software components of a manifest server 160, in accordance with one or more embodiments of the disclosure. The manifest server 160 may include one or more processors 312 and one or more memories 314 (referred to herein generically as memory 314). The processor(s) 312 may include any suitable processing unit capable of accepting digital data as input, processing the input data based on stored computer-executable instructions, and generating output data. The computer-executable instructions may be stored, for example, in the data storage 320 and may include, among other things, operating system software and application software. The computer-executable instructions may be retrieved from the data storage 320 and loaded into the memory 314 as needed for execution. The processor(s) 312 may be configured to execute the computer-executable instructions to cause various operations to be performed. The processor(s) 312 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 320 may store program instructions that are loadable and executable by the processor(s) 312, as well as data manipulated and generated by the processor(s) 312 during execution of the program instructions. The program instructions may be loaded into the memory 314 as needed for execution. Depending on the configuration and implementation of the manifest server(s) 160, the memory 314 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 314 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The manifest server(s) 160 may further include additional data storage 320 such as removable storage and/or non-removable storage including, but not limited to, magnetic storage, optical disk storage, and/or tape storage. Data storage 320 may provide non-volatile storage of computer-executable instructions and other data. The memory 314 and/or the data storage 320, removable and/or non-removable, are examples of computer-readable storage media (CRSM).

The manifest server(s) 160 may further include network interface(s) 318 that facilitate communication between the manifest server(s) 160 and other devices of the illustrative playlist segmentation system 100 or application software via the network(s) 130. The manifest server(s) 160 may additionally include one or more input/output (I/O) interfaces 316 (and optionally associated software components such as device drivers) that may support interaction between a manifest server 160 and a variety of I/O devices, such as a keyboard, a mouse, a pen, a pointing device, a voice input device, a touch input device, a display, speakers, a camera, a microphone, a printer, and so forth.

Referring again to the data storage 320, various program modules, applications, or the like may be stored therein that may comprise computer-executable instructions that when executed by the processor(s) 312 cause various operations to be performed. The memory 314 may have loaded from the data storage 320 one or more operating systems (O/S) 322 that may provide an interface between other application software (e.g., dedicated applications, a browser application, a web-based application, a distributed client-server application, etc.) executing on the manifest server(s) 160 and the hardware resources of the manifest server(s) 160. More specifically, the O/S 322 may include a set of computer-executable instructions for managing the hardware resources of the manifest server(s) 160 and for providing common services to other application programs (e.g., managing memory allocation among various application programs). The O/S 322 may include any operating system now known or which may be developed in the future including, but not limited to, any mobile operating system, desktop or laptop operating system, mainframe operating system, or any other proprietary or open-source operating system.

The data storage 320 may further include one or more database management systems (DBMS) 326 for accessing, retrieving, storing, and/or manipulating data stored in one or more datastores. The DBMS 326 may use any of a variety of database models (e.g., relational model, object model, etc.) and may support any of a variety of query languages.

The data storage 320 may additionally include various other program modules that may include computer-executable instructions for supporting a variety of associated functionality. For example, the data storage 320 may include one or more segmentation system(s) 328.

Within the data storage 320, one or more modules may be stored. As used herein, the term module may refer to a functional collection of instructions that may be executed by the one or more processor(s) 312. However, it is understood that in some implementations the various functions provided by the modules may be merged, separated, and so forth. Furthermore, the modules may intercommunicate or otherwise interact with one another, such that the conditions of one affect the operation of another.

The segmentation system(s) 328 may contain instructions stored that may be executed by the processors 312 to configure the manifest server 160 to provide a variety functionality associated with segmenting a media content playlist. The segmentation system(s) 328 may divide/segment the original media content playlist into one or more segments, each segment having a predetermined number of data portions (e.g., video portions). The number of data portions within a segment may be determined by various factors such as, network capability, user profile, user subscriptions, business user or home user, media content, etc. The segmentation may be performed before or after a request for the media content was made by the user. Since non-entertainment references may be appended to a media playlist segments and the non-entertainment references may point to a variable non-entertainment content, the segmentation may be performed before a user requests the media content. Consequently, users may receive the same or substantially similar playlist for a specific media content (e.g., the same movie) that may include the same non-entertainment references at predetermined offsets. In another embodiment, the segmentation system(s) 328 perform the segmentation after a user requests the media content. It is understood that the above are only examples for determining the number of data portions per segment, other conditions or parameters may be used to determine the number of data portions per segment. Although the segmentation system(s) 328 may be implemented as part of the manifest server 160, the functionality of the segmentation system(s) 328 may be implemented in different nodes in the network. For example, the segmentation system(s) 328 may be implemented within the policy server 170, within the VBO 145, within the client device 120, or in a cloud environment such as cost services, or any other nodes in the playlist segmentation system 400.

The dynamic insertion system(s) 330 contain instructions stored that may be executed by the processors 312 to configure the manifest server 160 to provide a variety functionality associated with dynamically inserting non-entertainment references to the one or more segments of the media content playlist. The dynamic insertion system(s) 330 may dynamically insert the non-entertainment references by appending at least one of the non-entertainment references at the end of each of the one or more segments. The dynamic insertion system(s) 330 may utilize the non-entertainment references to access the actual locations of the non-entertainment content. The dynamic insertion system(s) 330 may receive consumption data from one or more client devices 120 and may request new non-entertainment content based at least on consumption data that may be received from the client device 120 during playback of the media content. As explained above, the references to the non-entertainment content may remain constant and the non-entertainment content the references point to may change. For example, even when an ad decision has been made (e.g., presenting certain ads to the user 110), a new ad decision may be made during the streaming of the media content. Therefore, while a user 110 may be playing a certain media content (e.g., TV show, etc.), a new non-entertainment campaign (e.g. an ad campaign), may be initiated based on, at least in part, the user consumption data, which may result in a new non-entertainment content.

It will be appreciated that there may be an overlap in the functionality of the instructions stored in the operating systems (O/S) module 322, the applications module 324, and the segmentation system(s) 328. In fact, the functions of the aforementioned modules may interact and cooperate seamlessly under the framework of the manifest server 160. Indeed, each of the functions described for any of the modules 322, 324, 326 and 328 may be stored in any module 322, 324, 326 and 328 in accordance with certain embodiments of the disclosure. Further, in certain embodiments, there may be one single module that includes the instructions, programs, and/or applications described within the operating systems (O/S) module 322, the applications module 324, the DBMS 326 and the segmentation system(s) 328.

Figure 4:
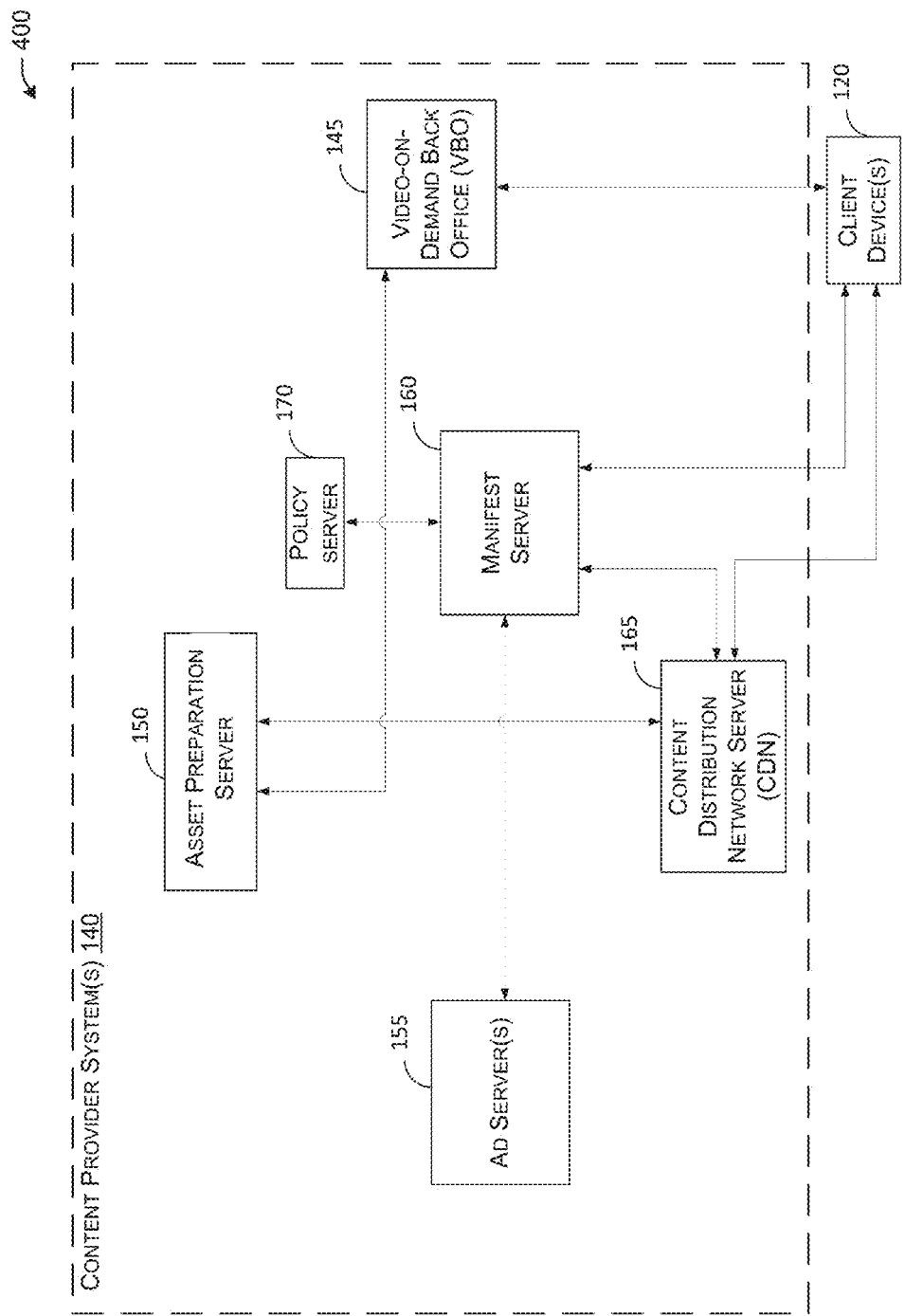
FIG. 4 is a simplified schematic diagram illustrating an example data flow playlist segmentation for dynamic content insertion into the playlist, in accordance with embodiments of the disclosure.

The systems and methods for dynamic ad insertion will now be described with reference to FIG. 4 with continuing reference to FIG. 1. FIG. 4 is a simplified schematic diagram illustrating a playlist segmentation system 400, in accordance with one or more embodiments of the disclosure.

In an example embodiment, the playlist segmentation system 400 may be an infrastructure associated with a cable content/television provider, wherein a media content, such as a pay-per-view movie, may be delivered to one or more client devices 120. The playlist segmentation system 400 may include VBO 145, asset preparation server 150, manifest server 160, CDN 165, ad server(s) 155, policy server 170.

Although the above components of the playlist segmentation system 400 are described herein in particular embodiments, it will be appreciated that, in other example embodiments, any of the individual components above may be combined with and/or substituted with any of the other components within the playlist segmentation system 400. Further, according to example embodiments of the disclosure, any of the individual components of the playlist segmentation system 400 may be partitioned into subcomponents, such as, distributed processing and/or computing components. Similarly, the processes performed by any of the components above, as described in example embodiments herein, may, in other example embodiments, be performed in cooperation with the other components, or by different components in its entirety. In example embodiments of the disclosure, the individual components of the playlist segmentation system 400 may be coupled with each other.

As explained above, the asset preparation server 150 may transcode a media content into one or more appropriate formats (e.g., MPEG-DASH, HLS, etc.). The transcoding by the asset preparation server 150 may be performed for all media content before being requested by a user. The asset preparation server 150 may break up the media content into small data portions to create one or more stream profiles. It is understood that a media content may be any audio, video, textual or other forms of media content. When the user 110 requests the playback of media content (e.g., a movie) from the VBO 145, the VBO 145 may return a master index URI containing indexes to multiple stream profiles. The master index may reference the data portions (e.g., video portions) associated with the media content for the multiple stream profiles. The client device 120 may then request the media content playlist (e.g., entertainment playlist for a movie) from the manifest server 160 for one or more of the multiple stream profiles. The request may contain information such as time of day, user profile, user subscription, client device information, etc. Once the client device 120 receives the master index, the client device 120 may determine which of the multiple stream profiles to utilize under the current conditions. The client device 120 may then request one of the multiple stream profiles from the manifest server 160. The manifest server 160 may then request from the ad server 155 non-entertainment content (e.g., ads) that may be presented to the user 110 requesting the playback of the media content. The non-entertainment content may be based at least in part on user preferences, demographics, and/or historical behavior of one or more of the users 110 within the experiential zone of the client device 120, user profile, client device identification, time of day, etc. For example, a user watching a TV show at midnight may influence an ad decision that may be different from a user watching a TV show during the morning hours.

Once the manifest server receives the one or more stream profiles from the client device 120, the manifest server 160 may request a media content playlist from a content distribution network server (e.g., CDN 165). After the manifest server 160 receives the media content playlist, the server 160 may divide/segment the media content playlist into one or more segments that may be transmitted at various time or data size intervals. The size of the segment may be based on a length of time, or may be based on the number of indexes within each segment. Each index may point to a variable length of video clip. The manifest server 160 may append a non-entertainment reference at the end of the one or more segments to point to a non-entertainment content (e.g., EAS messages, billing notification, ads, etc.). The non-entertainment reference may be a pointer to a memory location that contains the non-entertainment content (e.g. ads). The manifest server 160 may access the memory location of the non-entertainment content using the non-entertainment references to update and/or replace the non-entertainment content with the new non-entertainment content while the streaming session is ongoing. In other words, the manifest server 160 may use the non-entertainment references to update the non-entertainment content during the streaming of media content (e.g., while playing a movie on a client device 120). This may allow flexibility for updating the non-entertainment content at the location (e.g., memory in a service provider system) to which the reference points or references. There is no need to update the segmented playlist for the media content that already includes the references from user to user. For instance, an ad may be selected by a service provider system (e.g., a cable company) based at least in part on the user that requested the streaming of the media content (e.g., pay-per-view TV show, etc.). However, the user or group of users, that is determined to be the viewer of the media content using a client device, may change and the media content may be viewed by a different user or group of users, or perhaps the number of views for the selected ad reaches a certain threshold after selection but prior to playing and another ad suitable for insertion has not, or yet further, the location where the user is viewing the media content may have changed, for example, from a residence to a coffee shop. Accordingly, the manifest server 160 may update the ads referenced by the one or more non-entertainment references rather than updating the actual non-entertainment references themselves.

The non-entertainment content may be based at least on one or more ad campaigns. For example, the manifest server 160 may communicate with the ad server(s) 155 to acquire an ad playlist. The ad playlist may be associated with ads that may be played on the client device 120 during a streaming session. The non-entertainment references appended at the end of one or more segments may allow the manifest server 160 to access the ad playlist location when new ads are available. For example, during the viewing of the media content (e.g., the movie), and before reaching a point in the playlist where an ad may be played, the ad campaign may have changed (e.g., new ads to be presented to the user 110) based on consumption data. In another embodiment, other indication may trigger the manifest server 160 to change/update the non-entertainment content, e.g., billing reminder indication, announcement indication, and emergency content indication, where the manifest server may receive an indication that an EAS message may need to sent to the client device 120 during the view of the media content.

Illustrative Processes

Figure 5:
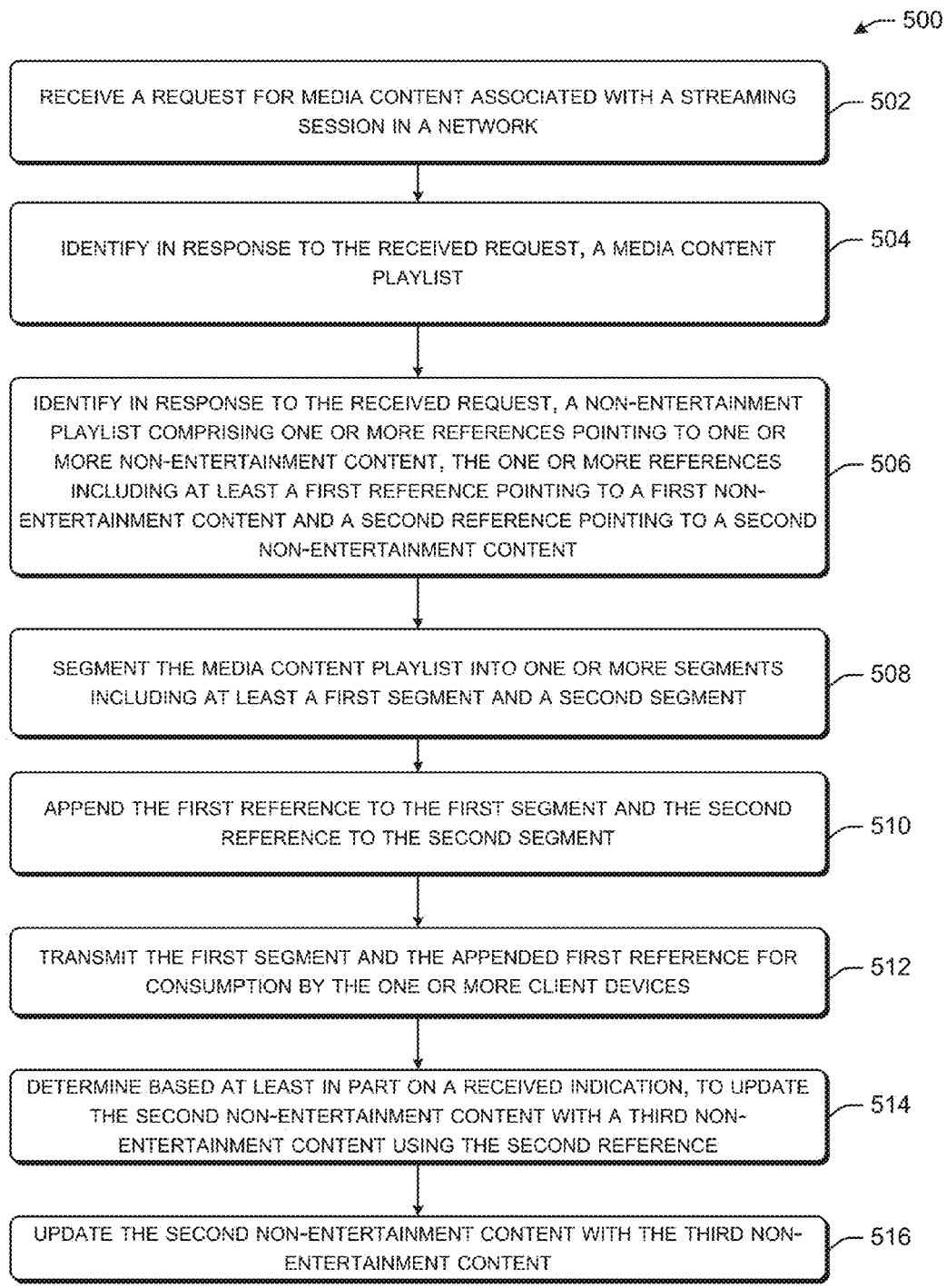
FIG. 5 is a flow diagram illustrating an example method for performing a playlist segmentation process, in accordance with embodiments of the disclosure.

FIG. 5 is a process flow diagram of a method for playlist segmentation. In some embodiments, at block 502, the manifest server 160 may receive a request for media content associated with a streaming session in a network. For example, an end-user (e.g., user 110) may request a media content, such as, video, audio, textual, etc. to be played on the end-user's device (e.g., client device 120).

At block 504, the manifest server 160 may identify, in response to the received request, a media content playlist comprising one or more indexes associated with the media content. Stated differently, a media content may be requested from the manifest server 160 to be consumed on a client device 120. The media content may be represented with a media content playlist that may include indexes pointing to the actual location of the data portions (e.g., video portions) of a media content (e.g., a movie).

At block 506, the manifest server 160 may identify in response to the received request for the media content, a first non-entertainment playlist comprising one or more references pointing to one or more first non-entertainment content. For example, the manifest server 160 may identify an ad playlist that contains references (e.g., indexes) that point to memory locations where the actual ads may be located. The non-entertainment references may point to a variable non-entertainment content, such that, the non-entertainment content may change but not the non-entertainment references themselves.

At block 508, the manifest server 160 may segment the media content playlist into one or more segments, each segment having a predetermined number of indexes to data portions per segment. In other words, the media content playlist may be segmented/divided into one or more segments, which may contain a number of indexes to data portions (e.g., indexes to video portions) comprising the media content. The segmentation may be performed before or after a request for the media content was made by the user. Since non-entertainment references may be appended to a media playlist segment and the non-entertainment references may point to a variable non-entertainment content, the segmentation may be performed before a user requests the media content. Consequently, users may receive the same or substantially similar playlist for a specific media content (e.g., the same movie) that may include the same non-entertainment references at predetermined offsets. In another embodiment, the segmentation system(s) 328 perform the segmentation after a user requests the media content.

At block 510, the manifest server 160 may append one or more non-entertainment references at the end of one or more media content playlist segments to reference a non-entertainment content (e.g., EAS messages, billing notification, ads, etc.). In other words, at the end of each segment, a non-entertainment reference that points to a memory location of one or more ads may be appended such that when a client device 120 streams the segments and when the client device 120 reaches the non-entertainment reference, the one or more ads may be streamed at the client device 120.

At block 512, the manifest server 160 may transmit the one or more segments and the appended at least one of the one or more references, to one or more client devices 120. For example, the manifest server 160 may send the indexes that reference the media content that the indexes point to in order to be used for retrieval of the media content data portions (e.g., video portions). In addition, the manifest server 160 may send the appended non-entertainment references to the client devices 120. This way, the client device 120 may retrieve the non-entertainment content (e.g., ads) that may be found at the memory location where the non-entertainment references point to.

At block 514, the manifest server 160 may receive consumption data associated with the consumption of the one or more segments and the appended reference(s), at the one or more client devices 120. Consumption data may include, for example, user profile, client device identification, time of day, user interactions associated with consumption of the one or more segments, and user consumption history. For example, the client device 120 may consume the received segments of the content, such as a video, ads, etc., by viewing, listening, reading, etc. on the client device 120. For example, a teenager (e.g., user 110) may view the content of the video on their TV associated with a set-top box (e.g., client device 120). The teenager may perform various actions on the TV set and/or the set-top box by, for example, changing channels, selecting shows, and any type of actions related to that user. These various actions may constitute consumption data that may be related back to the manifest server 160. Although the above examples is based on consumption data associated with the consumption of media segments, other indication may trigger the manifest server 160 to change/update the non-entertainment content, e.g., billing reminder indication, announcement indication, and emergency content indication, where the manifest server may receive an indication that an EAS message may need to sent to the client device 120 during the view of the media content.

At block 516, the manifest server 160 may identify a second non-entertainment content based on the consumption data. For example, the manifest server 160 may use the consumption data (e.g., user profile, user behavior while watching a TV show, etc.) to identify a second non-entertainment content based upon the user's profile that may be viewing a requested asset (e.g., a TV show, etc.).

At block 518, the manifest server 160 may utilize the first non-entertainment references to access the memory location where the first non-entertainment content is found to update/replace the first non-entertainment content (e.g., emergency alerts, subscription notification, ads with the second non-entertainment content based on the consumption data that was received by the manifest server 160 from the client device 120. For example, if one or more users 110 change or the location of the client device 120 changes, the manifest server 160 may receive consumption data reflecting the change. The manifest server 160 may, based on the consumption data, request a second non-entertainment content. It is understood that the above is an example of updating the non-entertainment content with another non-entertainment content based on consumption data received from the client device 120.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
   receiving, by a manifest server comprising one or more processors, from one or more client devices, a request for media content associated with a streaming session in a network;
   identifying, by the manifest server, in response to the received request, a media content playlist;
   identifying, by the manifest server, in response to the received request, a non-entertainment playlist comprising one or more references pointing to one or more non-entertainment content, the one or more references including at least a first reference pointing to a first non-entertainment content and a second reference pointing to a second non-entertainment content;
   segmenting, by the manifest server, the media content playlist into one or more segments including at least a first segment and a second segment;
   appending, by the manifest server, the first reference to the first segment and the second reference to the second segment;
   transmitting, by the manifest server, the first segment and the appended first reference for consumption by the one or more client devices;
   determining, by the manifest server based at least in part on a received indication, to update the second non-entertainment content with a third non-entertainment content using the second reference;
   updating, by the manifest server, the second non-entertainment content with the third non-entertainment content.

2. The method of claim 1, wherein the first reference points to a first memory location containing the first non-entertainment content and the second reference points to a second memory location containing the second non-entertainment content.

3. The method of claim 2, wherein updating the second non-entertainment content with the third non-entertainment content includes replacing the second non-entertainment content, at the second memory location, with the third non-entertainment content, wherein the second reference points to the third non-entertainment content.

4. The method of claim 1, wherein the received indication includes at least one of consumption data associated with the consumption of the first segment and the appended first reference by the one or more client devices, billing reminder indication, announcement indication, and emergency content indication.

5. The method of claim 4, wherein the consumption data comprises at least one of a user profile, a client device identification, a time of day, user interactions associated with consumption of at least one of the one or more segments, and a user consumption history.

6. The method of claim 1, wherein transmitting the first segment and the appended first reference to the one or more client devices comprises transmitting at intervals.

7. The method of claim 6, wherein the intervals are based on at least one of a time interval and a data size interval.

8. The method of claim 1, wherein identifying the non-entertainment playlist is based at least in part on a non-entertainment campaign associated with at least one of a user device, a user profile, time of day, one or more campaign, and consumption history.

9. The method of claim 1, wherein the one or more non-entertainment content includes at least one of advertisement, billing reminder, announcement, and emergency content.

10. A system comprising:
    at least one antenna;
    at least one transceiver;
    at least one memory storing computer-executable instructions, and
    at least one processor, wherein the at least one processor is configured to access the at least one memory and to execute the computer-executable instructions to:
    receive from one or more client devices, a request for media content associated with a streaming session in a network;
    identify in response to the received request, a media content playlist;
    identify in response to the received request, a non-entertainment playlist comprising one or more references pointing to one or more non-entertainment content, the one or more references including at least a first reference pointing to a first non-entertainment content and a second reference pointing to a second non-entertainment content;
    segment the media content playlist into one or more segments including at least a first segment and a second segment;
    append the first reference to the first segment and the second reference to the second segment;
    transmit the first segment and the appended first reference for consumption by the one or more client devices;
    determine based at least in part on a received indication, to update the second non-entertainment content with a third non-entertainment content using the second reference;
    update the second non-entertainment content with the third non-entertainment content.

11. The system of claim 10, wherein the first reference points to a first memory location containing the first non-entertainment content and the second reference points to a second memory location containing the second non-entertainment content.

12. The system of claim 11, wherein updating the second non-entertainment content with the third non-entertainment content includes replacing the second non-entertainment content, at the second memory location, with the third non-entertainment content, wherein the second reference points to the third non-entertainment content.

13. The system of claim 10, wherein the received indication includes at least one of consumption data associated with the consumption of the first segment and the appended first reference by the one or more client devices, billing reminder indication, announcement indication, and emergency content indication.

14. The system of claim 13, wherein the consumption data comprises at least one of a user profile, a client device identification, a time of day, user interactions associated with consumption of at least one of the one or more segments, and a user consumption history.

15. The system of claim 9, wherein the one or more non-entertainment content includes at least one of advertisement, billing reminder, announcement, and emergency content.

16. A non-transitory computer-readable medium storing computer-executable instructions which, when executed by a processor, cause the processor to perform operations comprising:

receiving from one or more client devices, a request for media content associated with a streaming session in a network;

receiving from one or more client devices, a request for media content associated with a streaming session in a network;

identifying in response to the received request, a media content playlist;

identifying in response to the received request, a non-entertainment playlist comprising one or more references pointing to one or more non-entertainment content, the one or more references including at least a first reference pointing to a first non-entertainment content and a second reference pointing to a second non-entertainment content;

segmenting the media content playlist into one or more segments including at least a first segment and a second segment;

appending the first reference to the first segment and the second reference to the second segment;

transmitting the first segment and the appended first reference for consumption by the one or more client devices;

determining based at least in part on a received indication, to update the second non-entertainment content with a third non-entertainment content using the second reference;

updating the second non-entertainment content with the third non-entertainment content.

17. The non-transitory computer-readable medium of claim 16, wherein the first reference points to a first memory location containing the first non-entertainment content and the second reference points to a second memory location containing the second non-entertainment content.

18. The non-transitory computer-readable medium of claim 17, wherein updating the second non-entertainment content with the third non-entertainment content includes replacing the second non-entertainment content, at the second memory location, with the third non-entertainment content, wherein the second reference points to the third non-entertainment content.

19. The non-transitory computer-readable medium of claim 16, wherein the received indication includes at least one of consumption data associated with the consumption of the first segment and the appended first reference by the one or more client devices, billing reminder indication, announcement indication, and emergency content indication.

20. The non-transitory computer-readable medium of claim 19, wherein the consumption data comprises at least one of a user profile, a client device identification, a time of day, user interactions associated with consumption of at least one of the one or more segments, and a user consumption history.

* * * * *